(12) United States Patent
Fujioka et al.

(10) Patent No.: US 8,411,117 B2
(45) Date of Patent: Apr. 2, 2013

(54) DISPLAY DEVICE HAVING OPTICAL SENSORS

(75) Inventors: Akizumi Fujioka, Osaka (JP); Akinori Kubota, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 244 days.

(21) Appl. No.: 12/809,288

(22) PCT Filed: Dec. 17, 2008

(86) PCT No.: PCT/JP2008/072951
§ 371 (c)(1),
(2), (4) Date: Jun. 18, 2010

(87) PCT Pub. No.: WO2009/081810
PCT Pub. Date: Jul. 2, 2009

(65) Prior Publication Data
US 2011/0141151 A1  Jun. 16, 2011

(30) Foreign Application Priority Data
Dec. 20, 2007  (JP) .................................. 2007-328200

(51) Int. Cl.
*G09G 5/00* (2006.01)
(52) U.S. Cl. .......................... 345/690; 345/102; 345/104
(58) Field of Classification Search .................. 345/690, 345/104, 207, 102, 173–178; 178/18.01–18.09, 178/18.11
See application file for complete search history.

(56) References Cited

U.S. PATENT DOCUMENTS

| 6,103,558 A | 8/2000 | Yamanaka et al. |
| 6,236,063 B1 | 5/2001 | Yamazaki et al. |
| 7,327,341 B2 | 2/2008 | Toriumi et al. |
| 2004/0066358 A1 | 4/2004 | Numao |

(Continued)

FOREIGN PATENT DOCUMENTS

| CN | 101086566 A | 12/2007 |
| EP | 1 610 210 A1 | 12/2005 |

(Continued)

OTHER PUBLICATIONS

U.S. Appl. No. 12/742,154, filed May 10, 2010, entitled Display Device Having Optical Sensors.

(Continued)

*Primary Examiner* — Stephen Sherman
(74) *Attorney, Agent, or Firm* — Nixon & Vanderhye P.C.

(57) ABSTRACT

The present invention relates to a display device that has a plurality of optical sensors provided in a display panel and that can be operated by touching a screen with a finger or pen. A liquid crystal panel with built-in sensors (11) includes a plurality of pixel circuits (1) and a plurality of optical sensors (2) which are arranged two-dimensionally. An MPU (18) selects either a mode that detects a shadow image of an object or a mode that detects a reflection image of the object, based on an illumination of outside light. One frame time is divided into a display period and a sensing period. A backlight (14) is controlled to be turned on during the display period in the shadow image mode and during the sensing period in the reflection image mode, and to be turned off during the sensing period in the shadow image mode and during the display period in the reflection image mode. According to the present invention, the detection accuracy for a touch position is increased while the power consumption of the backlight is suppressed.

4 Claims, 13 Drawing Sheets

U.S. PATENT DOCUMENTS

| | | |
|---|---|---|
| 2004/0169625 A1 | 9/2004 | Park et al. |
| 2005/0225546 A1 | 10/2005 | Akimoto |
| 2006/0007224 A1* | 1/2006 | Hayashi et al. ............... 345/207 |
| 2006/0077186 A1 | 4/2006 | Park et al. |
| 2006/0192766 A1 | 8/2006 | Nakamura et al. |
| 2006/0244693 A1 | 11/2006 | Yamaguchi et al. |
| 2006/0256093 A1 | 11/2006 | Furukawa et al. |
| 2006/0262055 A1 | 11/2006 | Takahara |
| 2006/0262110 A1 | 11/2006 | Fukuda et al. |
| 2007/0057925 A1 | 3/2007 | Hung |
| 2007/0132710 A1 | 6/2007 | Tateuchi et al. |
| 2008/0122792 A1* | 5/2008 | Izadi et al. .................... 345/173 |
| 2008/0122803 A1 | 5/2008 | Izadi et al. |
| 2008/0143736 A1 | 6/2008 | Clatanoff et al. |
| 2008/0211787 A1 | 9/2008 | Nakao et al. |
| 2008/0252617 A1 | 10/2008 | Nakamura et al. |
| 2008/0259051 A1 | 10/2008 | Ota |
| 2009/0115772 A1 | 5/2009 | Shiomi et al. |
| 2010/0271335 A1 | 10/2010 | Gotoh et al. |
| 2010/0283765 A1 | 11/2010 | Gotoh et al. |
| 2010/0289784 A1 | 11/2010 | Fujioka et al. |

FOREIGN PATENT DOCUMENTS

| | | |
|---|---|---|
| EP | 1 653 438 A2 | 5/2006 |
| JP | 3-153211 | 7/1991 |
| JP | 07-325319 | 12/1995 |
| JP | 08-272529 | 10/1996 |
| JP | 08-286206 | 11/1996 |
| JP | 10-260643 | 9/1998 |
| JP | 11-326954 | 11/1999 |
| JP | 2006-317682 | 11/2006 |
| JP | 2006-317682 A | 11/2006 |
| JP | 2006-323261 | 11/2006 |
| JP | 2006-323311 A | 11/2006 |
| JP | 2007-033789 | 2/2007 |
| JP | 2007-163891 | 6/2007 |
| JP | 2007-163891 A | 6/2007 |
| JP | 2008-209645 | 9/2008 |
| JP | 2008-224935 | 9/2008 |
| JP | 2008-224935 A | 9/2008 |
| KR | 10-0690295 | 3/2007 |
| WO | WO 2007/122777 A1 | 11/2007 |

OTHER PUBLICATIONS

U.S. Appl. No. 12/811,138, filed Jun. 29, 2010, entitled Display Device Having Optical Sensors.

International Search Report for PCT/JP2009/052478, mailed Apr. 7, 2009.

International Search Report for PCT/JP2008/072391, mailed Feb. 3, 2009.

International Search Report for PCT/JP2008/072951, mailed Mar. 17, 2009.

Office Action issued in U.S. Appl. No. 12/742,154 dated Jun. 13, 2012.

Office Action issued in U.S. Appl. No. 12/811,138 dated Apr. 4, 2012.

English Translation of Chinese Office Action issued in Application No. 200980105945.7, dated Nov. 30, 2011.

Brown, C.J., et al., "A Continuous-Grain Silicon-System LCD with Optical Input Function," IEEE Journal of Solid-State Circuits, vol. 42, No. 12, Dec. 2007.

International Search Report issued in PCT/JP2009/052860, dated May 19, 2009.

English Translation of Chinese Office Action issued in Application No. 200980101435.2, dated Jan. 31, 2012.

* cited by examiner

|  | DISPLAY PERIOD | SENSING PERIOD |
|---|---|---|
| SHADOW IMAGE MODE | TURN ON BLUE LED AND GREEN LED IN TURN | TURN ON RED LED |
| REFLECTION IMAGE MODE | TURN ON RED LED AND GREEN LED IN TURN | TURN ON BLUE LED |

DISPLAY DEVICE HAVING OPTICAL SENSORS

This application is the U.S. national phase of International Application No. PCT/JP2008/072951, filed 17 Dec. 2008, which designated the U.S. and claims priority to Japanese Application No. 2007-328200, filed 20 Dec. 2007, the entire contents of each of which are hereby incorporated by reference.

TECHNICAL FIELD

The present invention relates to a display device and more particularly to a display device having a plurality of optical sensors provided in a display panel.

BACKGROUND ART

In recent years, electronic devices that can be operated by touching a screen with a finger, a pen, etc., have proliferated. In addition, for a method of detecting a touch position on a display screen, a method is known in which a plurality of optical sensors are provided in a display panel and a shadow image which is created when a finger or the like approaches a screen is detected using the optical sensors.

In relation to this, Patent Document 1 describes a display device in which a backlight is turned on during a display period for displaying display data on a display unit and the backlight is turned off during a sensing period during which sensor outputs from sensor units are read. According to the display device, the influence of backlight light upon detecting a shadow image is reduced, enabling to improve the detection accuracy of optical sensors.

However, in the method of detecting a shadow image, when the illumination of outside light is low (the surroundings are dark), it may become difficult to distinguish between a shadow image and a background in an image obtained by the optical sensors and accordingly a touch position may not be able to be detected properly. Hence, for display devices including a backlight, a method is also devised in which a reflection image which is created when backlight light hits a finger is detected using optical sensors.

[Patent Document 1] Japanese Patent Application Laid-Open No. 2006-317682

DISCLOSURE OF THE INVENTION

Problems to be Solved by the Invention

However, for backlight control for the case of using the method of detecting a reflection image, no specific methods have been devised so far. Hence, when the luminance of the backlight is fixed as in conventional cases, there is a problem that if the luminance is reduced then the detection accuracy for a touch position decreases, and if the luminance is increased then the power consumption of the backlight increases.

An object of the present invention is therefore to increase the detection accuracy for a touch position while the power consumption of a backlight is suppressed in a display device including a plurality of optical sensors.

Means for Solving the Problems

According to a first aspect of the present invention, there is provided a display device having a plurality of optical sensors, the display device including: a display panel including a plurality of pixel circuits and a plurality of optical sensors which are arranged two-dimensionally; a drive circuit that drives the display panel; a backlight that directs light to a back surface of the display panel; and a backlight control unit that controls the backlight such that, when a reflection image of an object is detected, an amount of light detected by the optical sensors is larger during a sensing period during which signals are read from the optical sensors than during a display period during which signals are written into the pixel circuits.

According to a second aspect of the present invention, in the first aspect of the present invention, the display device further includes an operating mode selecting unit that selects one of a shadow image mode that detects a shadow image of the object and a reflection image mode that detects a reflection image of the object, wherein the backlight control unit controls the backlight such that, when the reflection image mode is selected, the amount of light detected by the optical sensors is larger during the sensing period than during the display period.

According to a third aspect of the present invention, in the second aspect of the present invention, the backlight control unit controls the backlight such that, when the reflection image mode is selected, luminance thereof is higher during the sensing period than during the display period.

According to a fourth aspect of the present invention, in the third aspect of the present invention, the backlight control unit controls the backlight such that, when the shadow image mode is selected, the luminance thereof is lower during the sensing period than during the display period.

According to a fifth aspect of the present invention, in the second aspect of the present invention, the backlight includes light sources of a plurality of colors, and the backlight control unit controls turn-on states of the light sources, according to light reception characteristics of the optical sensors.

According to a sixth aspect of the present invention, in the fifth aspect of the present invention, when the reflection image mode is selected, the backlight control unit turns on light sources of a color with a high light reception sensitivity of the optical sensors with a higher priority during the sensing period.

According to a seventh aspect of the present invention, in the sixth aspect of the present invention, when the shadow image mode is selected, the backlight control unit turns on light sources of a color with a low light reception sensitivity of the optical sensors with a higher priority during the sensing period.

According to an eighth aspect of the present invention, in the second aspect of the present invention, the display device further includes an illumination sensor that detects an illumination of outside light, wherein the operating mode selecting unit selects one of the shadow image mode and the reflection image mode, based on the illumination detected by the illumination sensor.

According to a ninth aspect of the present invention, in the second aspect of the present invention, the display device further includes a characteristic detecting unit that obtains a characteristic of display data which is supplied to the display panel, wherein the operating mode selecting unit selects one of the shadow image mode and the reflection image mode, based on the characteristic obtained by the characteristic detecting unit.

According to a tenth aspect of the present invention, in the ninth aspect of the present invention, the characteristic detecting unit obtains, as the characteristic of the display data, an amount of a color with a high light reception sensitivity of the optical sensors.

According to an eleventh aspect of the present invention, there is provided a method of driving a display device having a display panel including a plurality of pixel circuits and a plurality of optical sensors which are arranged two-dimensionally; a drive circuit that drives the display panel; and a backlight that directs light to a back surface of the display panel, the method including the steps of: writing signals into the pixel circuits using the drive circuit; reading signals from the optical sensors using the drive circuit; and controlling the backlight such that, when a reflection image of an object is detected, an amount of light detected by the optical sensors is larger during a sensing period during which the signals are read from the optical sensors than during a display period during which the signals are written into the pixel circuits.

Effect of the Invention

According to the first or eleventh aspect of the present invention, when a reflection image of an object is detected, the amount of light (reflected light) detected by the optical sensors is made larger during the sensing period than during the display period, whereby, while the power consumption of the backlight is suppressed, the luminance of the reflection image increases, enabling to increase the detection accuracy for a touch position.

According to the second aspect of the present invention, by selecting a suitable operating mode according to the conditions and making the amount of light (reflected light) detected by the optical sensors larger during the sensing period than during the display period in the reflection image mode, while the power consumption of the backlight is suppressed, the luminance of a reflection image increases, enabling to increase the detection accuracy for a touch position in the reflection image mode.

According to the third aspect of the present invention, by setting the luminance of the backlight higher during the sensing period than during the display period in the reflection image mode, the amount of light (reflected light) detected by the optical sensors can be increased. With this, while the power consumption of the backlight is suppressed, the luminance of a reflection image increases, enabling to increase the detection accuracy for a touch position in the reflection image mode.

According to the fourth aspect of the present invention, by setting the luminance of the backlight lower during the sensing period than during the display period in the shadow image mode, the amount of light detected by the optical sensors can be reduced. With this, the influence of backlight light upon detecting a shadow image is reduced, enabling to increase the detection accuracy for a touch position in the shadow image mode.

According to the fifth aspect of the present invention, by controlling the turn-on states of the light sources of a plurality of colors, according to the light reception characteristics of the optical sensors, the light reception sensitivity of the optical sensors is controlled suitably according to the conditions, enabling to increase the detection accuracy for a touch position.

According to the sixth aspect of the present invention, by turning on light sources of a color with a high light reception sensitivity of the optical sensors with a higher priority during the sensing period in the reflection image mode, the amount of light (reflected light) detected by the optical sensors can be increased. With this, while the power consumption of the backlight is suppressed, the luminance of a reflection image increases, enabling to increase the detection accuracy for a touch position in the reflection image mode.

According to the seventh aspect of the present invention, by turning on light sources of a color with a low light reception sensitivity of the optical sensors with a higher priority during the sensing period in the shadow image mode, the amount of light detected by the optical sensors can be reduced. With this, the influence of backlight light upon detecting a shadow image is reduced, enabling to increase the detection accuracy for a touch position in the shadow image mode.

According to the eighth aspect of the present invention, taking into account the fact that a shadow image is easy to detect when the illumination of outside light is high and a shadow image is difficult to detect when the illumination of outside light is low, a suitable operating mode is selected based on the illumination of outside light, whereby the detection accuracy for a touch position can be increased while the power consumption of the backlight is suppressed.

According to the ninth aspect of the present invention, a suitable operating mode is selected based on the characteristic of display data, whereby the detection accuracy for a touch position can be increased while the power consumption of the backlight is suppressed.

According to the tenth aspect of the present invention, taking into account the fact that a shadow image is easy to detect when the amount of a color with a high light reception sensitivity of the optical sensors is small and a shadow image is difficult to detect when such an amount is large, a suitable operating mode is selected based on the amount of a color with a high light reception sensitivity of the optical sensors, whereby the detection accuracy for a touch position can be increased while the power consumption of the backlight is suppressed.

DESCRIPTION OF THE REFERENCE NUMERALS

1 PIXEL CIRCUIT
2 OPTICAL SENSOR
6 PHOTODIODE
10, 20, and 30 LIQUID CRYSTAL DISPLAY DEVICE
11 LIQUID CRYSTAL PANEL WITH BUILT-IN SENSORS
12 PANEL DRIVE CIRCUIT
13 and 23 BACKLIGHT POWER SUPPLY CIRCUIT
14 and 24 BACKLIGHT
15 A/D CONVERTER
16 and 36 IMAGE PROCESSING UNIT
17 ILLUMINATION SENSOR
18, 28, and 38 MICROPROCESSOR UNIT (MPU)
19 and 29 LED
41 SCANNING SIGNAL LINE DRIVE CIRCUIT
42 DATA SIGNAL LINE DRIVE CIRCUIT
43 SENSOR ROW DRIVE CIRCUIT
44 SENSOR OUTPUT AMPLIFIER
45 to 48 SWITCH
61 OUTSIDE LIGHT
62 BACKLIGHT LIGHT
63 OBJECT

BEST MODE FOR CARRYING OUT THE INVENTION (First Embodiment)

Figure 1:
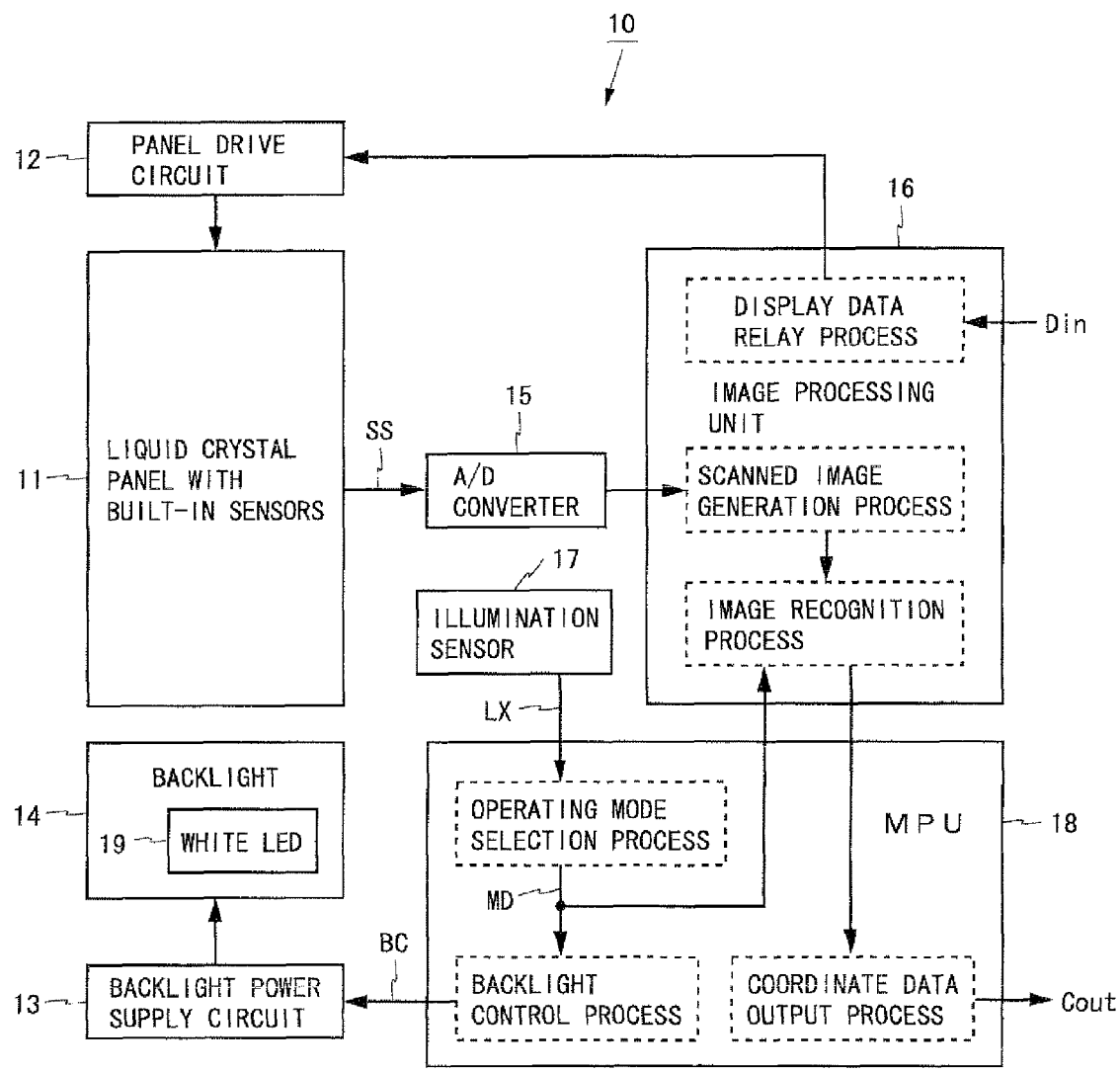
FIG. 1 is a block diagram showing a configuration of a liquid crystal display device according to a first embodiment of the present invention.

FIG. 1 is a block diagram showing a configuration of a liquid crystal display device according to a first embodiment of the present invention. A liquid crystal display device 10 shown in FIG. 1 includes a liquid crystal panel with built-in sensors 11, a panel drive circuit 12, a backlight power supply circuit 13, a backlight 14, an A/D converter 15, an image processing unit 16, an illumination sensor 17, and a microprocessor unit (hereinafter, referred to as the MPU) 18.

The liquid crystal panel with built-in sensors 11 (hereinafter, referred to as the liquid crystal panel 11) includes a plurality of pixel circuits and a plurality of optical sensors which are arranged two-dimensionally (details will be described later). Display data Din is inputted to the liquid crystal display device 10 from an external source. The inputted display data Din is supplied to the panel drive circuit 12 via the image processing unit 16. The panel drive circuit 12 writes voltages according to the display data Din into the pixel circuits of the liquid crystal panel 11. With this, an image based on the display data Din is displayed on the liquid crystal panel 11.

The backlight 14 includes a plurality of white LEDs (Light Emitting Diodes) 19 and directs light (backlight light) to a back surface of the liquid crystal panel 11. The backlight power supply circuit 13 switches whether to supply a power supply voltage to the backlight 14, according to a backlight control signal BC which is outputted from the MPU 18. In the following, it is assumed that the backlight power supply circuit 13 supplies a power supply voltage when the backlight control signal BC is at a high level, and does not supply a power supply voltage when the backlight control signal BC is at a low level. The backlight 14 is turned on while the backlight control signal BC is at a high level, and is turned off while the backlight control signal BC is at a low level.

The liquid crystal panel 11 outputs output signals from the optical sensors as sensor output signals SS. The A/D converter 15 converts the analog sensor output signals SS to digital signals. The image processing unit 16 generates a digital image (hereinafter, referred to as a scanned image), based on the digital signals outputted from the A/D converter 15. The scanned image may include an image of a matter to be detected (e.g., a finger, a pen, etc.; hereinafter, referred to as an object) which is present in the vicinity of the front surface of the liquid crystal panel 11. Hence, the image processing unit 16 performs an image recognition process on the scanned image to determine an object position in the scanned image. The MPH 18 obtains and outputs coordinate data Cout representing a touch position, based on an image recognition result obtained by the image processing unit 16.

The illumination sensor 17 detects an illumination of outside light and outputs illumination data LX representing the detected illumination. The illumination sensor 17 is disposed such that backlight light does not enter a light receiving surface thereof. The MPH 18 selects, based on the illumination data LX, either a mode that detects a shadow image of the object (hereinafter, referred to as the "shadow image mode") or a mode that detects a reflection image of the object (hereinafter, referred to as the reflection image mode). In the reflection image mode, only a reflection image of the object may be detected or both a shadow image and a reflection image of the object may be detected. The mode selected by the MPU 18 is hereinafter referred to as an operating mode MD.

The MPU 18 performs backlight control, based on the operating mode MD. In the liquid crystal display device 10, one frame time is divided into a display period during which signals (voltage signals according to the display data Din) are written into the pixel circuits and a sensing period during which signals (voltage signals according to the amounts of light) are read from the optical sensors. The MPH 18 switches, for the display period and the sensing period, whether to turn on or off the backlight 14, according to the operating mode MD. In addition, the operating mode MD is outputted to the image processing unit 16 from the MPU 18 and the image processing unit 16 switches between algorithms for the image recognition process, according to the operating mode MD. Note that the MPU 18 may perform all or part of the image recognition process.

Figure 2:
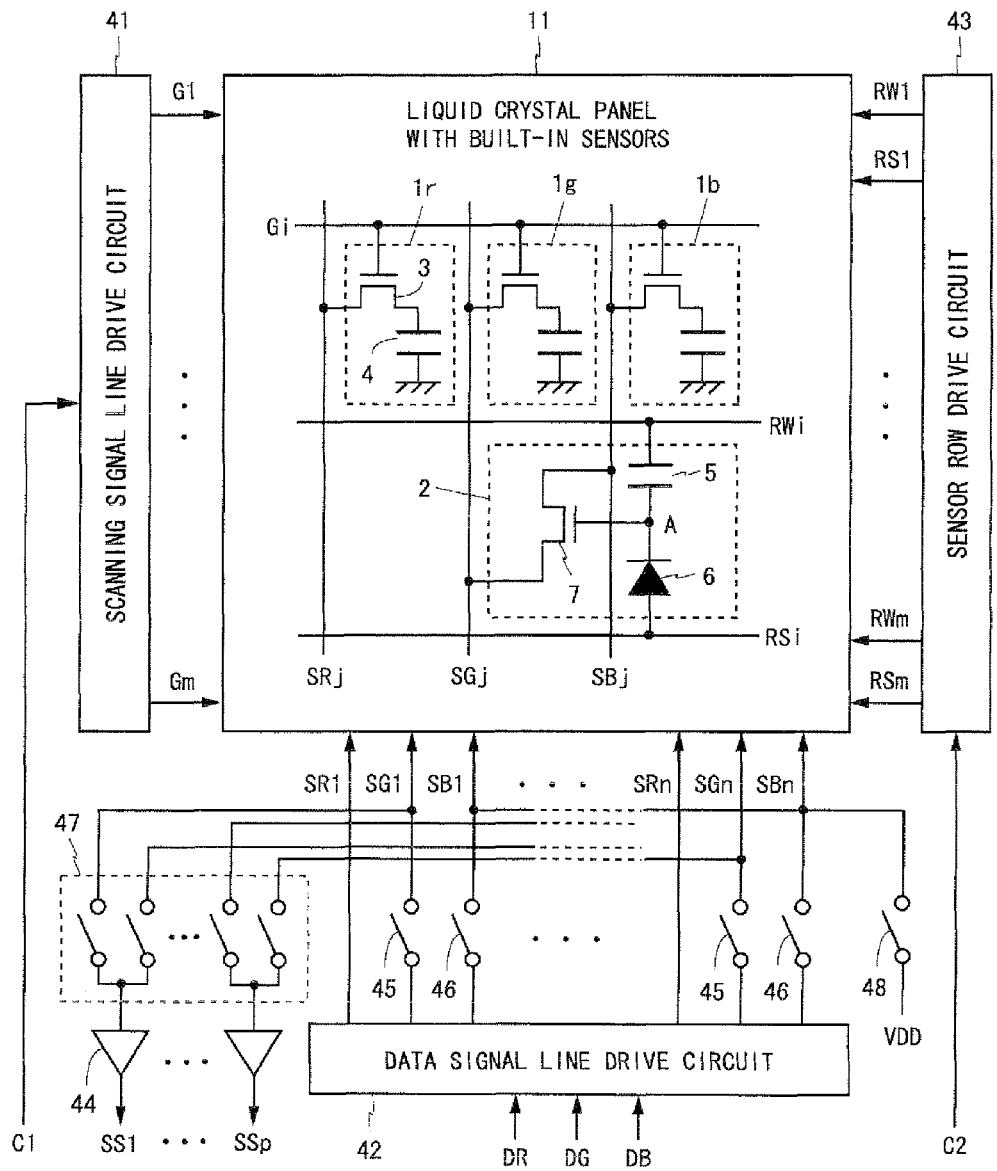
FIG. 2 is a block diagram showing a configuration of a liquid crystal panel and peripheral circuits of the device shown in FIG. 1.

FIG. 2 is a block diagram showing a configuration of the liquid crystal panel 11 and peripheral circuits. As shown in FIG. 2, the liquid crystal panel 11 includes m scanning signal lines G1 to Gm; 3n data signal lines SR1 to SRn, SG1 to SGn, and SB1 to SBn; and (m×3n) pixel circuits 1. In addition to them, the liquid crystal panel 11 includes (m×n) optical sensors 2; m sensor read lines RW1 to RWm; and m sensor reset lines RS1 to RSm. The liquid crystal panel 11 is formed using CG (Continuous Grain) silicon.

The scanning signal lines G1 to Gm are arranged parallel to one another. The data signal lines SR1 to SRn, SG1 to SGn, and SB1 to SBn are arranged parallel to one another so as to vertically intersect the scanning signal lines G1 to Gm. The sensor read lines RW1 to RWm and the sensor reset lines RS1 to RSm are arranged parallel to the scanning signal lines G1 to Gm.

The pixel circuits 1 are respectively provided near intersections of the scanning signal lines G1 to Gm and the data signal lines SR1 to SRn, SG1 to SGn, and SB1 to SBn. The pixel circuits 1 as a whole are arranged two-dimensionally such that m pixel circuits 1 are arranged in a column direction (a vertical direction in FIG. 2) and 3n pixel circuits 1 are arranged in a row direction (a horizontal direction in FIG. 2). The pixel circuits 1 are classified into R pixel circuits 1r, G pixel circuits 1g, and B pixel circuits 1b, depending on the color of a color filter provided. The three types of pixel circuits 1r, 1g, and 1b are arranged side by side in the row direction and three pixel circuits 1r, 1g, and 1b form one pixel.

Each pixel circuit 1 includes a TFT (Thin Film Transistor) 3 and a liquid crystal capacitance 4. A gate terminal of the TFT 3 is connected to a corresponding scanning signal line Gi (i is an integer between 1 and m inclusive), a source terminal is connected to a corresponding one of the data signal lines SRj, SGj, and SBj (j is an integer between 1 and n inclusive), and a drain terminal is connected to one electrode of the liquid crystal capacitance 4. To the other electrode of the liquid crystal capacitance 4 is applied a common electrode voltage. The data signal lines SG1 to SGn connected to the G pixel circuits 1g are hereinafter referred to as the G data signal lines and the data signal lines SB1 to SBn connected to the B pixel circuits 1b as the B data signal lines. Note that the pixel circuits 1 may include an auxiliary capacitance.

The light transmittance of a pixel circuit 1 (the luminance of a sub-pixel) is determined by a voltage written into the pixel circuit 1. To write a certain voltage into a pixel circuit 1 connected to a scanning signal line Gi and a data signal line SXj (X is any one of R, G, and B), a high-level voltage (a voltage that places a TFT 3 in an on state) is applied to the scanning signal line Gi and a voltage to be written is applied to the data signal line SXj. By writing a voltage according to display data Din into the pixel circuit 1, the luminance of the sub-pixel can be set to a desired level.

Each optical sensor 2 includes a capacitor 5, a photodiode 6, and a sensor preamplifier 7, and is provided for each pixel. One electrode of the capacitor 5 is connected to a cathode terminal of the photodiode 6 (hereinafter, this connecting point is referred to as the node A). The other electrode of the capacitor 5 is connected to a corresponding sensor read line RWi and an anode terminal of the photodiode 6 is connected to a corresponding sensor reset line RSi. The sensor preamplifier 7 is configured by a TFT having a gate terminal connected to the node A and having a drain terminal connected to a corresponding B data signal line SBj and having a source terminal connected to a corresponding G data signal line SGj.

To detect the amount of light by an optical sensor 2 connected to a sensor read line RWi, a B data signal line SBj, etc., a predetermined voltage is applied to the sensor read line RWi and a sensor reset line RSi and a power supply voltage VDD is applied to the B data signal line SBj. After the predetermined voltage is applied to the sensor read line RWi and the sensor reset line RSi, when light enters a photodiode 6, a current according to the amount of entered light flows through the photodiode 6 and accordingly the voltage at a node A decreases by an amount corresponding to the amount of current having flown through. When a power supply voltage VDD is applied to the B data signal line SBj, the voltage at the node A is amplified by a sensor preamplifier 7 and thus the amplified voltage is outputted to a G data signal line SGj. Therefore, based on the voltage of the G data signal line SGj, the amount of light detected by the optical sensor 2 can be determined.

Around the liquid crystal panel 11 are provided a scanning signal line drive circuit 41, a data signal line drive circuit 42, a sensor row drive circuit 43, p sensor output amplifiers 44 (p is an integer between 1 and n inclusive), and a plurality of switches 45 to 48. The scanning signal line drive circuit 41, the data signal line drive circuit 42, and the sensor row drive circuit 43 correspond to the panel drive circuit 12 in FIG. 1.

The data signal line drive circuit 42 has 3n output terminals for the respective 3n data signal lines. The switches 45 are respectively provided between the G data signal lines SG1 to SGn and n output terminals provided for the respective G data signal lines SG1 to SGn, and the switches 46 are respectively provided between the B data signal lines SB1 to SBn and n output terminals provided for the respective B data signal lines SB1 to SBn. The G data signal lines SG1 to SGn are divided into groups, each including p G data signal lines. One switch 47 is provided between a k-th G data signal line in a group (k is an integer between 1 and p inclusive) and an input terminal of a k-th sensor output amplifier 44. All the B data signal lines SB1 to SBn are connected to one end of the switch 48. To the other end of the switch 48 is applied a power supply voltage VDD. The respective numbers of the switches 45 to 47 included in FIG. 2 are n and the number of the switches 48 is 1.

The circuits shown in FIG. 2 perform operations that differ between the display period and the sensing period. During the display period, the switches 45 and 46 are placed in an on state and the switches 47 and 48 are placed in an off state. On the other hand, during the sensing period, the switches 45 and 46 are placed in an off state and the switch 48 is placed in an on state and the switches 47 are placed in an on state in a time-division manner such that the G data signal lines SG1 to SGn are connected in turn to the input terminals of the sensor output amplifiers 44 on a group-by-group basis.

During the display period, the scanning signal line drive circuit 41 and the data signal line drive circuit 42 operate. The scanning signal line drive circuit 41 selects, every line time, one scanning signal line from among the scanning signal lines G1 to Gm according to a timing control signal C1, and applies a high-level voltage to the selected scanning signal line and applies a low-level voltage to the other scanning signal lines. The data signal line drive circuit 42 drives the data signal lines SR1 to SRn, SG1 to SGn, and SB1 to SBn by a line sequential system, based on display data DR, DG, and DB outputted from the image processing unit 16. More specifically, the data signal line drive circuit 42 stores at least a portion of each of the display data DR, DG, and DB for one row and applies, every line time, voltages according to the portions of the display data for one row to the data signal lines SR1 to SRn, SG1 to SGn, and SB1 to SBn. Note that the data signal line drive circuit 42 may drive the data signal lines SR1 to SRn, SG1 to SGn, and SB1 to SBn by a dot sequential system.

During the sensing period, the sensor row drive circuit 43 and the sensor output amplifiers 44 operate. The sensor row drive circuit 43 selects, every line time, one each from the sensor read lines RW1 to RWm and the sensor reset lines RS1 to RSm according to a timing control signal C2, and applies a predetermined read voltage and a predetermined reset voltage to the selected sensor read line and sensor reset line, respectively, and applies a voltage different than those applied upon selection, to the other signal lines. Note that typically the length of one line time differs between the display period and the sensing period. The sensor output amplifiers 44 amplify voltages selected by their corresponding switches 47 and output the amplified voltages as sensor output signals SS1 to SSp.

Figure 3:
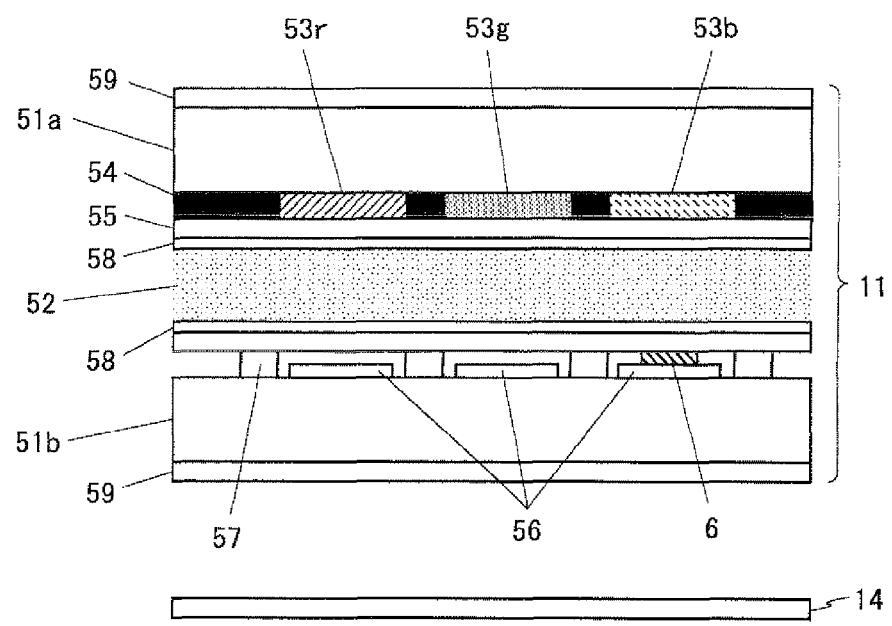
FIG. 3 is a diagram showing a cross section of the liquid crystal panel and an arrangement position of a backlight of the device shown in FIG. 1.

FIG. 3 is a diagram showing a cross section of the liquid crystal panel 11 and an arrangement position of the backlight 14. The liquid crystal panel 11 has a structure in which a liquid crystal layer 52 is sandwiched between two glass substrates 51a and 51b. One glass substrate 51a has color filters 53r, 53g, and 53b of three colors, light-shielding films 54, a counter electrode 55, etc., provided thereon. The other glass substrate 51b has pixel electrodes 56, data signal lines 57, optical sensors 2, etc., provided thereon. As shown in FIG. 3, a photodiode 6 included in an optical sensor 2 is provided near a pixel electrode 56 where a blue color filter 53b is provided (the reason will be described later). Alignment films 58 are respectively provided on surfaces of the glass substrates 51a and 51b that face each other, and polarizing plates 59 are respectively provided on the other surfaces. Of the two surfaces of the liquid crystal panel 11, a surface on the side of the glass substrate 51a serves as the front surface and a surface on the side of the glass substrate 51b serves as the back surface. The backlight 14 is provided on the back surface side of the liquid crystal panel 11.

Figure 4A:
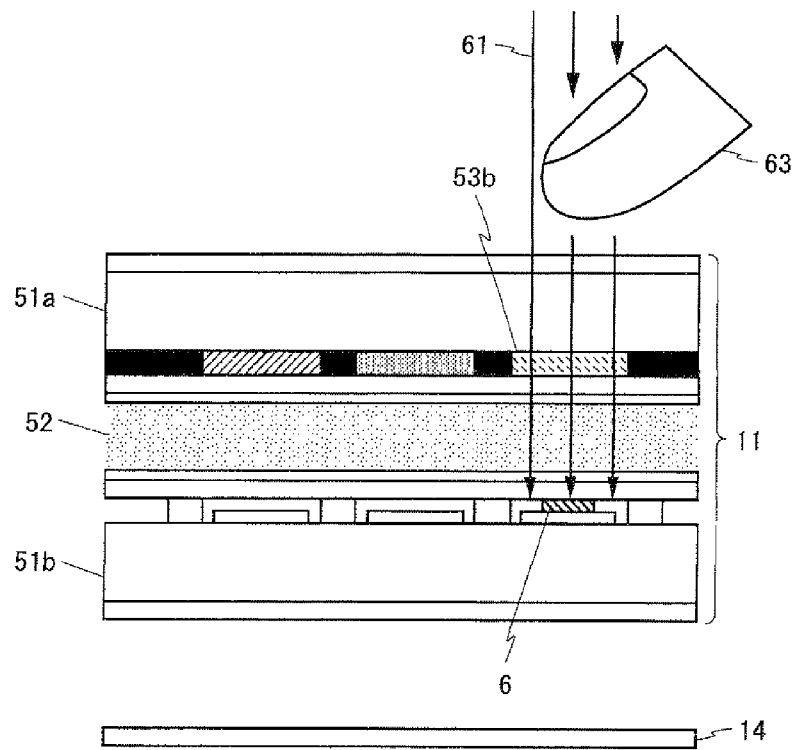
FIG. 4A is a diagram showing the principle of a method of detecting a shadow image in the device shown in FIG. 1.
Figure 4B:
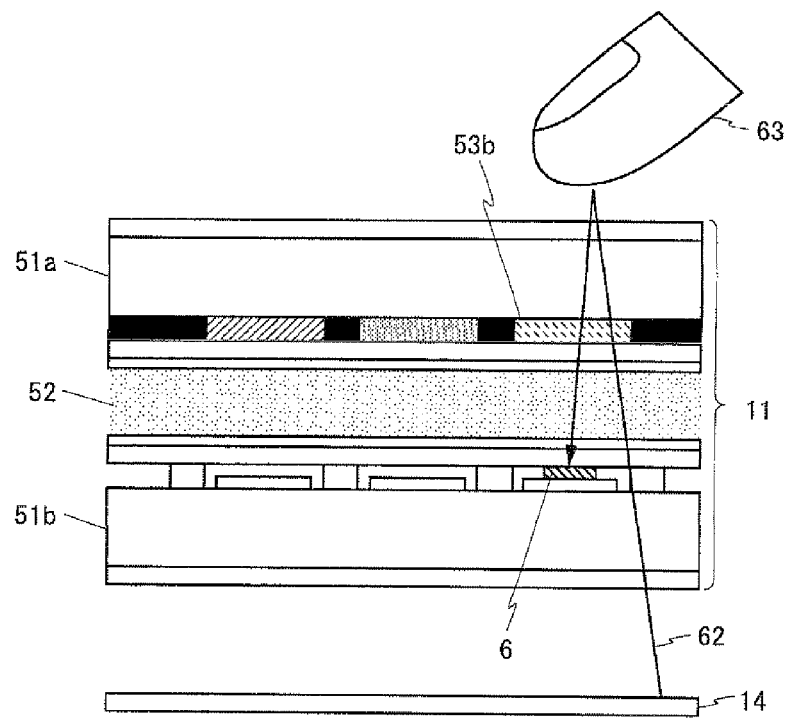
FIG. 4B is a diagram showing the Principle of a method of detecting a reflection image in the device shown in FIG. 1.

When the liquid crystal display device 10 detects a touch position on a liquid crystal screen, the liquid crystal display device 10 uses a method of detecting a shadow image and a method of detecting a reflection image (or both a shadow image and a reflection image) by switching from one to another. FIG. 4A is a diagram showing the principle of the method of detecting a shadow image and FIG. 4B is a diagram showing the principle of the method of detecting a reflection image. In the method of detecting a shadow image (FIG. 4A), an optical sensor 2 including a photodiode 6 detects outside light 61 having passed through the glass substrate 51a, the liquid crystal layer 52, etc. At this time, when an object 63 such as a finger is present in the vicinity of the front surface of the liquid crystal panel 11, the outside light 61 to enter the optical sensor 2 is blocked by the object 63. Thus, using the optical sensor 2, a shadow image of the object 63 by the outside light 61 can be detected.

In the method of detecting a reflection image (FIG. 4B), an optical sensor 2 including a photodiode 6 detects reflected light of backlight light 62. More specifically, the backlight light 62 emitted from the backlight 14 passes through and gets out of the liquid crystal panel 11 through the front surface of the liquid crystal panel 11. At this time, when an object 63 is present in the vicinity of the front surface of the liquid crystal panel 11, the backlight light 62 is reflected off the object 63. For example, the balls of human fingers reflect light well. The reflected light of the backlight light 62 passes through the glass substrate 51a, the liquid crystal layer 52, etc., and enters the optical sensor 2. Thus, using the optical sensor 2, a reflection image of the object 63 by the backlight light 62 can be detected.

By using the above-described two methods in combination, both a shadow image and a reflection image can be detected. That is, using the optical sensor 2, a shadow image of the object 63 by the outside light 61 and a reflection image of the object 63 by the backlight light 62 can be simultaneously detected.

When the liquid crystal panel 11 is formed of CG silicon, the light reception sensitivity of the photodiodes 6 is high for blue light and is low for red light and green light. Hence, to facilitate the reception of blue light, as shown in FIG. 3, the photodiode 6 is provided near the pixel electrode 56 where the blue color filter 53b is provided. By thus arranging the photodiode 6 in a position where light of a color with a high light reception sensitivity is easily received, the amount of light detected by the photodiode 6 increases, enabling to increase the light reception sensitivity of the optical sensor 2.

Figures 5, 6:
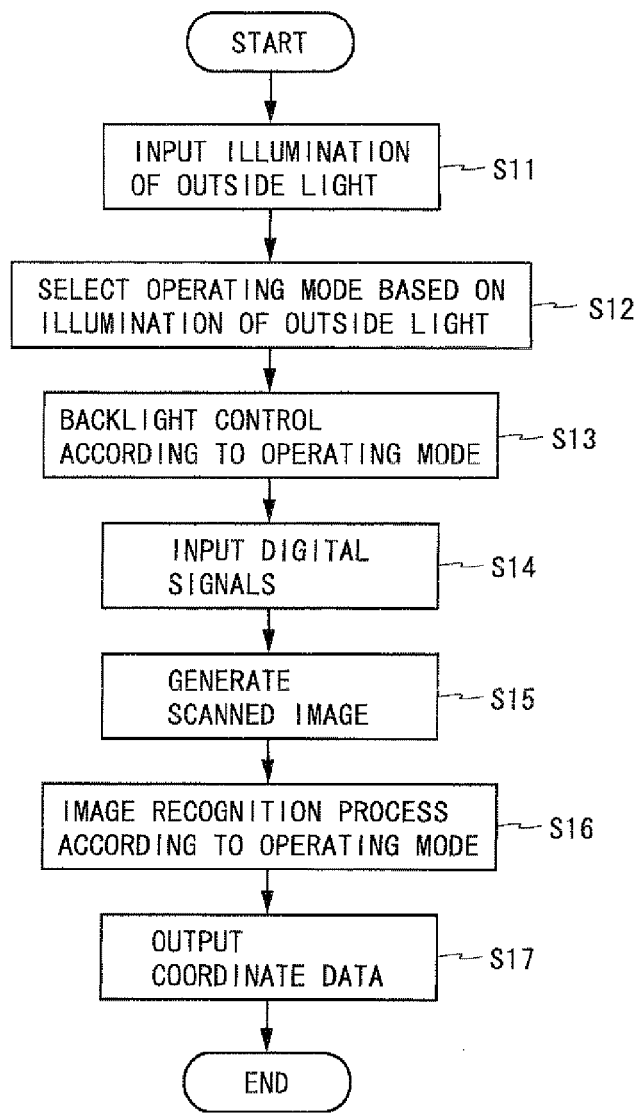
FIG. 5 is a flowchart showing a touch position detection process performed by the device shown in FIG. 1.
FIG. 6 is a table showing backlight control performed by the device shown in FIG. 1.

FIG. 5 is a flowchart showing a touch position detection process performed by the liquid crystal display device 10. The process shown in FIG. 5 is performed by the image processing unit 16 and the MPU 18 every frame time. First, illumination data LX representing the illumination of outside light is inputted to the MPU 18 from the illumination sensor 17 (step S11). Then, the MPU 18 selects an operating mode MD, based on the illumination data LX (step S12). In step 512, when the illumination of outside light is higher than or equal to a predetermined threshold value, the shadow image mode is selected, and when the illumination of outside light is lower than the threshold value, the reflection image mode is selected.

Then, the MPU 18 controls the backlight 14, according to the operating mode MD (step S13). In step S13, backlight control shown in FIG. 6 is performed. In the shadow image mode, the MPU 18 turns on the backlight 14 during the display period and turns off the backlight 14 during the sensing period. On the other hand, in the reflection image mode, the MPU 18 turns off the backlight 14 during the display period and turns on the backlight 14 during the sensing period. The MPU 18 sets the backlight control signal BC to a high level when turning on the backlight 14, and sets the backlight control signal BC to a low level when turning off the backlight 14.

Then, digital signals outputted from the A/D converter 15 are inputted to the image processing unit 16 (step S14). Then, the image processing unit 16 generates a scanned image, based on the inputted digital signals (step S15). The image processing unit 16 then performs an image recognition process according to the operating mode MD, on the scanned image (step S16). In step S16, in the shadow image mode, a process for recognizing a shadow image is performed, and in the reflection image mode, a process for recognizing a reflection image (or both a shadow image and a reflection image) is performed. Then, the MPU 18 obtains coordinate data Cout representing a touch position, based on an image recognition result obtained by the image processing unit 16, and outputs the coordinate data Cout external to the liquid crystal display device 10 (step S17). As such, the MPU 18 functions as an operating mode selecting unit that selects either the shadow image mode or the reflection image mode, and as a backlight control unit that controls the backlight 14 according to the operating mode.

Figure 7A:
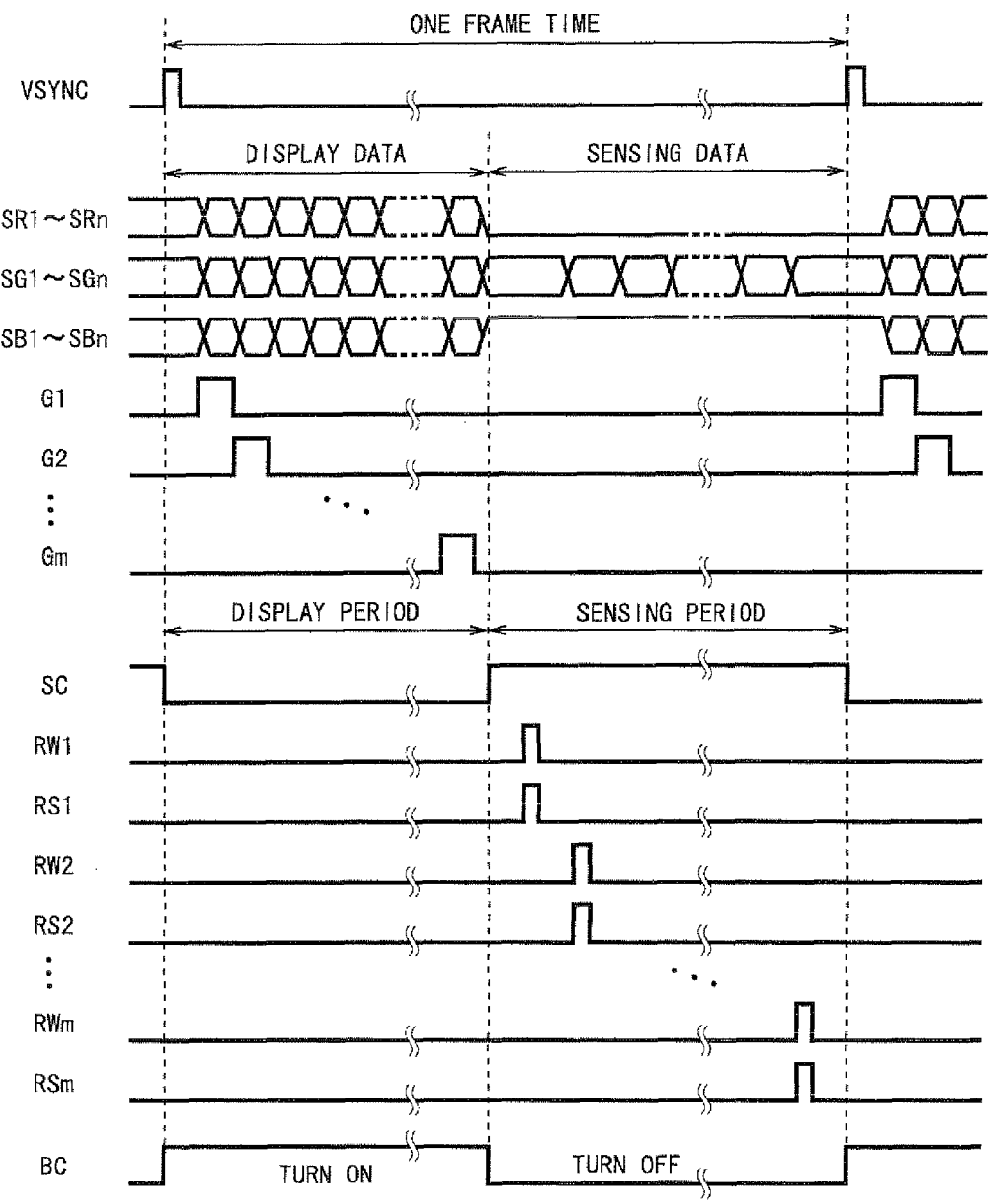
FIG. 7A is a timing chart for a shadow image mode of the device shown in FIG. 1.
Figure 7B:
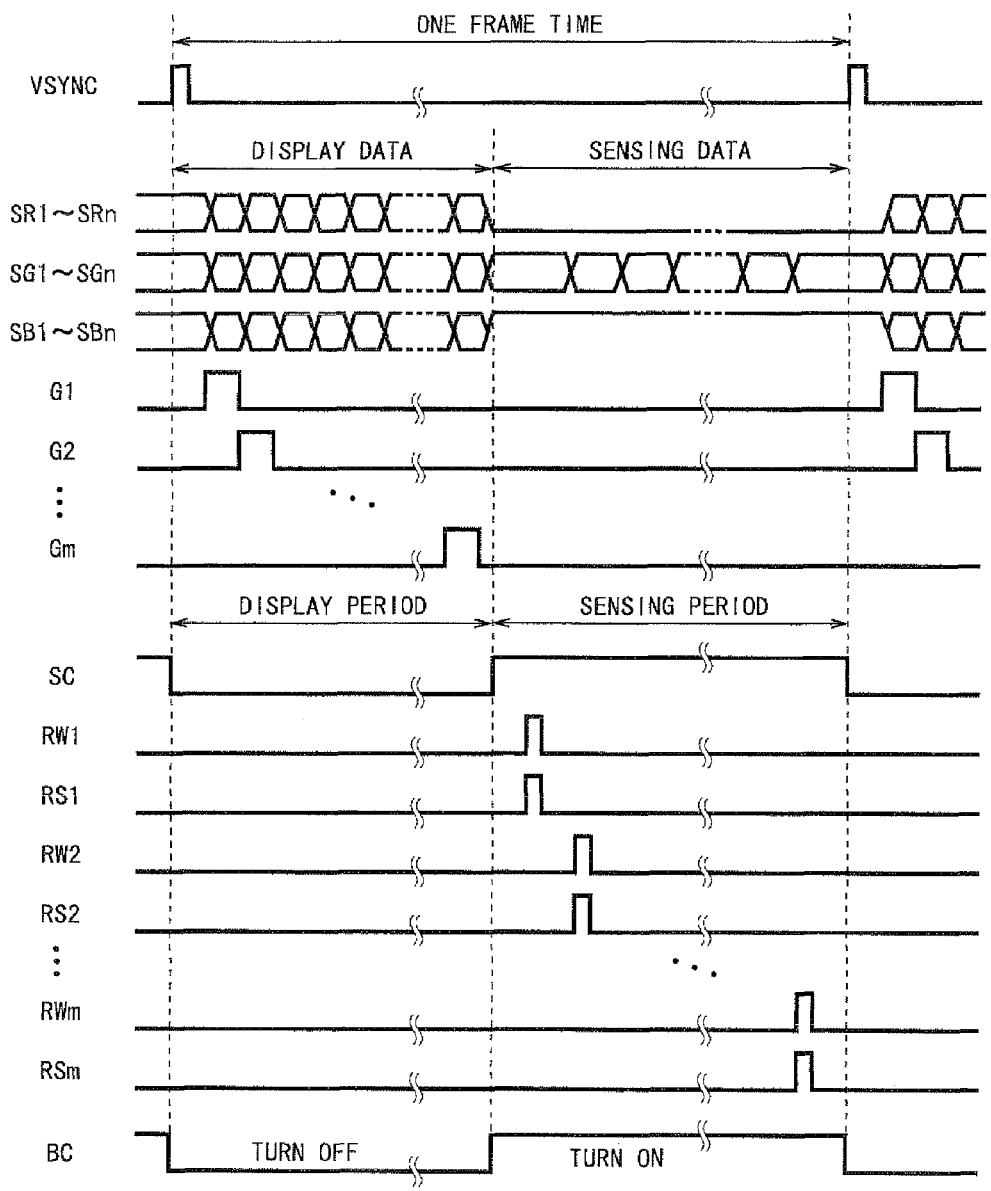
FIG. 7B is a timing chart for a reflection image mode of the device shown in FIG. 1.

FIG. 7A is a timing chart for the shadow image mode of the liquid crystal display device 10 and FIG. 7B is a timing chart for the reflection image mode of the liquid crystal display device 10. In FIGS. 7A and 7B, waveforms are all the same except for the waveform of the backlight control signal BC. As shown in FIGS. 7A and 7B, a vertical synchronizing signal VSYNC goes to a high level every frame time. One frame time is divided into a display period and a sensing period. A sense signal SC is a signal indicating whether the period is the display period or the sensing period. The sense signal SC is at a low level during the display period and is at a high level during the sensing period.

During the display period, the switches 45 and 46 are placed in an on state and all the data signal lines SR1 to SRn, SG1 to SGn, and SB1 to SBn are connected to the data signal line drive circuit 42. During the display period, first, the voltage of the scanning signal line G1 goes to a high level. Then, the voltage of the scanning signal line G2 goes to a high level and thereafter the voltages of the scanning signal lines G3 to Gm go to a high level in turn. While the voltage of a scanning signal line Gi is at a high level, voltages to be written into 3n pixel circuits 1 connected to the scanning signal line Gi are applied to the data signal lines SR1 to SRn, SG1 to SGn, and SB1 to SBn.

During the sensing period, the switch 48 is placed in an on state and the switches 47 are placed in an on state in a time-division manner. Hence, a power supply voltage VDD is fixedly applied to the B data signal lines SB1 to SBn, and the G data signal lines SG1 to SGn are connected to the input terminals of the sensor output amplifiers 44 in a time-division manner. During the sensing period, first, the sensor read line RW1 and the sensor reset line RS1 are selected. Then, the sensor read line RW2 and the sensor reset line RS2 are selected and thereafter the sensor read lines RW3 to RWm and the sensor reset lines RS3 to RSm are selected in turn on a pair-by-pair basis. A read voltage and a reset voltage are applied to the selected sensor read line and sensor reset line, respectively. While a sensor read line RWi and a sensor reset line RSi are selected, voltages according to the amounts of light detected by respective n optical sensors 2 connected to the sensor read line RWi are outputted to the G data signal lines SG1 to SGn, respectively.

In the shadow image mode (FIG. 7A), the backlight control signal BC is at a high level during the display period and is at a low level during the sensing period. In this case, the backlight 14 is turned on during the display period and is turned off during the sensing period. On the other hand, in the reflection image mode (FIG. 7B), the backlight control signal BC is at a low level during the display period and is at a high level during the sensing period. In this case, the backlight 14 is turned off during the display period and is turned on during the sensing period.

Figure 8A:
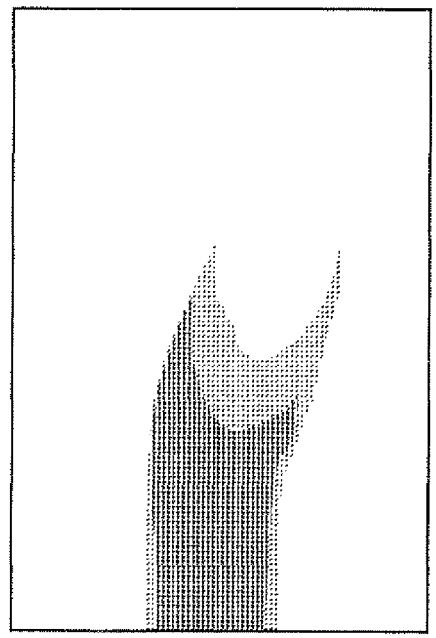
FIG. 8A is a diagram showing a first example of a scanned image including a finger image.
Figure 8B:
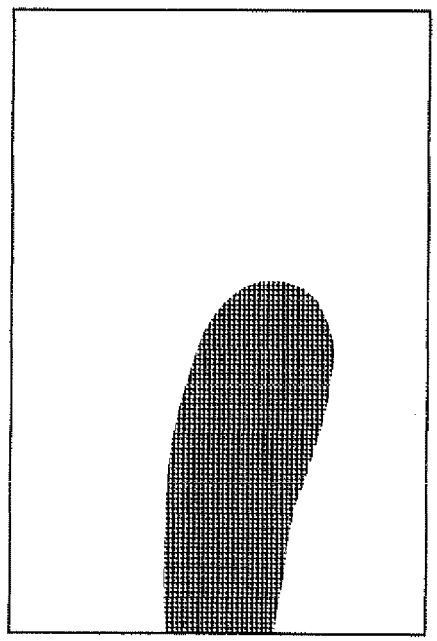
FIG. 8B is a diagram showing a second example of the scanned image including a finger image.
Figure 8C:
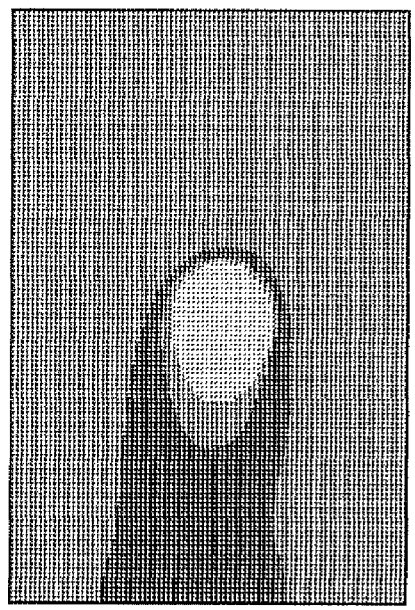
FIG. 8C is a diagram showing a third example of the scanned image including a finger image.
Figure 8D:
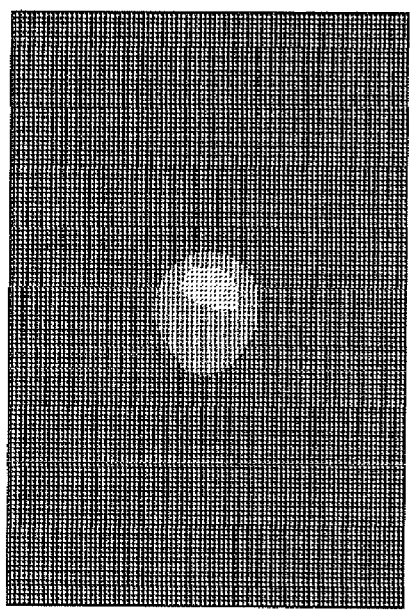
FIG. 8D is a diagram showing a fourth example of the scanned image including a finger image.

The effects of the liquid crystal display device 10 according to the present embodiment will be described below. FIGS. 8A to 8D are diagrams showing examples of a scanned image including a finger image. FIG. 8A shows a scanned image for the case of turning on the backlight when the illumination of outside light is high, FIG. 8B shows a scanned image for the case of turning off the backlight when the illumination of outside light is high, FIG. 8C shows a scanned image for the case of turning on the backlight when the illumination of outside light is low, and FIG. 8D shows a scanned image for the case of turning on the backlight darkly when the illumination of outside light is low.

As shown in FIGS. 8A and 8B, when the illumination of outside light is high, a scanned image including a dark finger image (a shadow image by the outside light) in a bright background is obtained. When, at this time, the backlight is turned on (FIG. 8A), backlight light reflects off the ball of a finger and thus a portion of the scanned image corresponding to the ball of the finger is brightened to the same extent as the background. Hence, a boundary between the finger (in particular, a finger tip portion) and the background becomes unclear in the scanned image, decreasing the detection accuracy for a touch position. In view of this, the liquid crystal display device 10 selects the shadow image mode when the illumination of outside light is high and turns off the backlight 14 during the sensing period (FIG. 8B). With this, the portion of the scanned image corresponding to the ball of the finger is darkened and thus the finger image (shadow image) is recognized properly even in the bright background, enabling to increase the detection accuracy for a touch position.

On the other hand, as shown in FIGS. 8C and 8D, when the illumination of outside light is low, a scanned image including a dark finger image in a dark background is obtained. When, at this time, the backlight is turned off, it becomes difficult to distinguish between a finger and the background in the scanned image and accordingly a touch position cannot be detected almost at all. In view of this, the liquid crystal display device 10 selects the reflection image mode when the illumination of outside light is low and turns on the backlight 14 during the sensing period (FIG. 8C). At this time, since backlight light reflects off the ball of the finger, a portion of the scanned image corresponding to the ball of the finger is brightened. Accordingly, the image of the ball of the finger (reflection image) is recognized properly even in the dark background, enabling to increase the detection accuracy for a touch position.

To increase the detection accuracy for a touch position when the illumination of outside light is low, it is preferred that the luminance of the backlight be high. For example, when the backlight is turned on darkly, a scanned image shown in FIG. 8D is obtained. In the scanned image, since the image of the ball of the finger (reflection image) is small, it is difficult to properly detect a touch position. However, increasing the luminance of the backlight causes a problem of an increase in the power consumption of the backlight. In view of this, the liquid crystal display device 10 turns off the backlight 14 during the display period in the reflection image mode. With this, the power consumption of the backlight can be reduced with the detection accuracy for a touch position being maintained.

As described above, the liquid crystal display device 10 according to the present embodiment selects either the shadow image mode or the reflection image mode, based on the illumination of outside light, and performs backlight control and an image recognition process according to the operating mode. With this, the backlight 14 is controlled to be turned on during the display period in the shadow image mode and during the sensing period in the reflection image mode, and to be turned off during the sensing period in the shadow image mode and during the display period in the reflection image mode.

Hence, when the illumination of outside light is low, the reflection image mode is selected and the luminance of the backlight 14 is set higher during the sensing period than during the display period, whereby the amount of light (reflected light) detected by the optical sensors 2 can be increased. With this, while the power consumption of the backlight 14 is suppressed, the luminance of a reflection image increases, enabling to increase the detection accuracy for a touch position in the reflection image mode. In contrast, when the illumination of outside light is high, the shadow image mode is selected and the luminance of the backlight 14 is set lower during the sensing period than during the display period, whereby the amount of light detected by the optical sensors 2 can be reduced. With this, the influence of backlight light upon detecting a shadow image is reduced, enabling to increase the detection accuracy for a touch position in the shadow image mode. As such, a suitable operating mode is selected based on the illumination of outside light, whereby the detection accuracy for a touch position can be increased while the power consumption of the backlight 14 is suppressed.

The above-described effects will be specifically described comparing with a liquid crystal display device in which the luminance of a backlight is the same for the display period and the sensing period (hereinafter, referred to as the conventional device). In order for the liquid crystal display device 10 to detect a reflection image at the same accuracy as the conventional device, the luminance of the backlight 14 during the sensing period in the reflection image mode is set to the same level as that for the conventional device. Meanwhile, in the liquid crystal display device 10, the luminance of the backlight 14 is controlled to be lower during the display period than during the sensing period in the reflection image mode. Therefore, according to the liquid crystal display device 10, while a reflection image is detected at the same accuracy as the conventional device, the power consumption of the backlight 14 can be reduced. Note, however, that in this case the luminance of a display screen of the liquid crystal display device 10 is lower than that for the conventional device.

Hence, in order not to reduce the luminance of the display screen, in the liquid crystal display device 10, the luminance of the backlight 14 may be set higher than that for the conventional device. In this case, since the luminance of the backlight 14 during the sensing period in the reflection image mode is higher than that for the conventional device, a clearer reflection image than that detected by the conventional device can be detected using the optical sensors 2. Therefore, according to the liquid crystal display device 10, the detection accuracy for a touch position can be increased further over the conventional device, without increasing the power consumption of the backlight 14.

Note that although in the above description, the liquid crystal display device 10 turns off the backlight 14 during the sensing period in the shadow image mode and during the display period in the reflection image mode, the liquid crystal display device 10 may turn on the backlight 14 darkly during the sensing period in the shadow image mode and during the display period in the reflection image mode. In general, by controlling the backlight such that the luminance thereof is lower during the sensing period than during the display period in the shadow image mode and controlling the backlight such that the luminance thereof is higher during the sensing period than during the display period in the reflection image mode, the detection accuracy for a touch position can be increased while the power consumption of the backlight is suppressed.

(Second Embodiment)

Figures 9, 10:
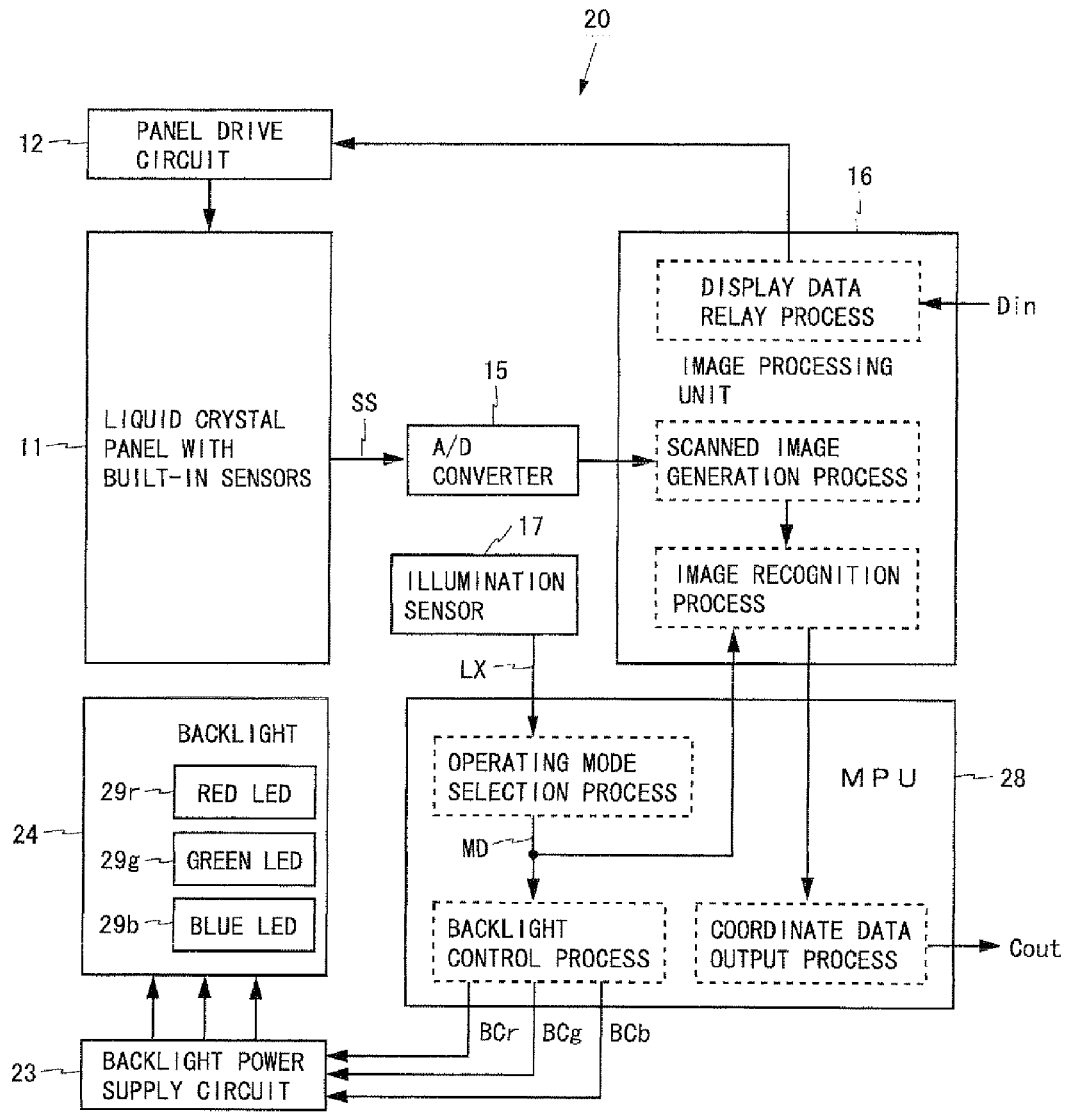
FIG. 9 is a block diagram showing a configuration of a liquid crystal display device according to a second embodiment of the present invention.
FIG. 10 is a table showing backlight control performed by the device shown in FIG. 9.

FIG. 9 is a block diagram showing a configuration of a liquid crystal display device according to a second embodiment of the present invention. A liquid crystal display device 20 shown in FIG. 9 is such that in the liquid crystal display device 10 according to the first embodiment (FIG. 1), the backlight power supply circuit 13, the backlight 14, and the MPU 18 are replaced by a backlight power supply circuit 23, a backlight 24, and an MPU 28, respectively. Of the components in the present embodiment, the same components as those in the first embodiment are denoted by the same reference numerals and description thereof is omitted.

The backlight 24 includes a plurality of red LEDs 29r, a plurality of green LEDs 29g, and a plurality of blue LEDs 29b. The three types of LEDs 29r, 29g, and 29b are controlled to be turned on in turn for a predetermined period of time during one frame time. The backlight power supply circuit 23 individually switches whether to supply a power supply voltage to the red LEDs 29r, the green LEDs 29g, and the blue LEDs 29b, according to three backlight control signals BCr, BCg, and BCb which are outputted from the MPU 28. The backlight power supply circuit 23 supplies a power supply voltage to the red LEDs 29r when the backlight control signal BCr is at a high level, and does not supply a power supply voltage to the red LEDs 29r when the backlight control signal BCr is at a low level. The red LEDs 29r are turned on while the backlight control signal BCr is at a high level, and are turned off while the backlight control signal BCr is at a low level. The green LEDs 29g and the blue LEDs 29b operate in the same way as above.

Figure 11A:
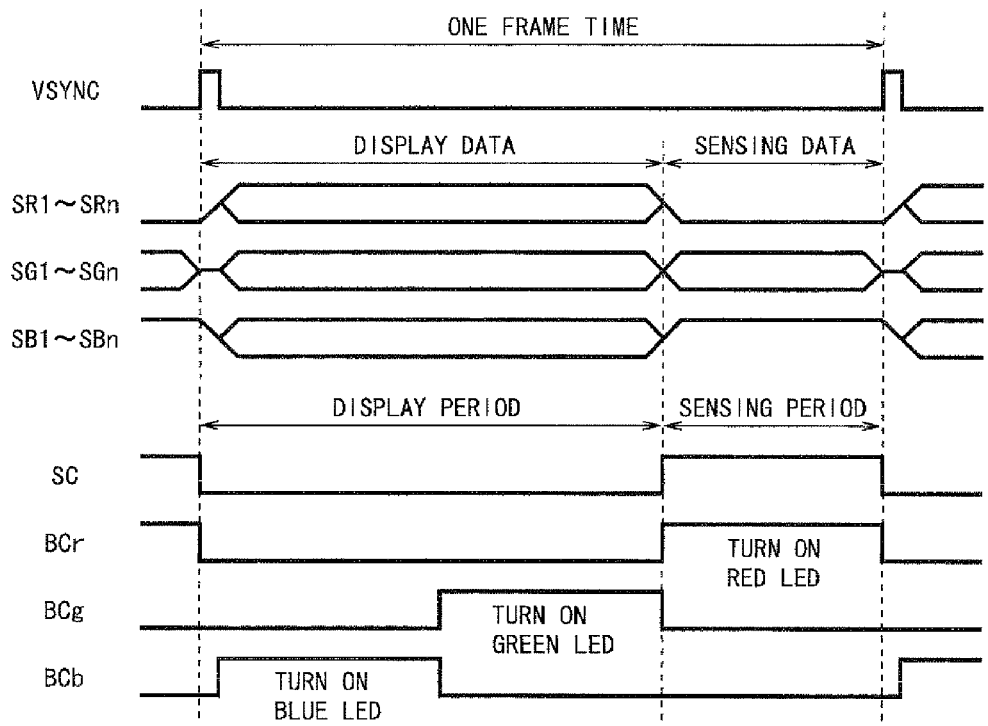
FIG. 11A is a timing chart for a shadow image mode of the device shown in FIG. 9.
Figure 11B:
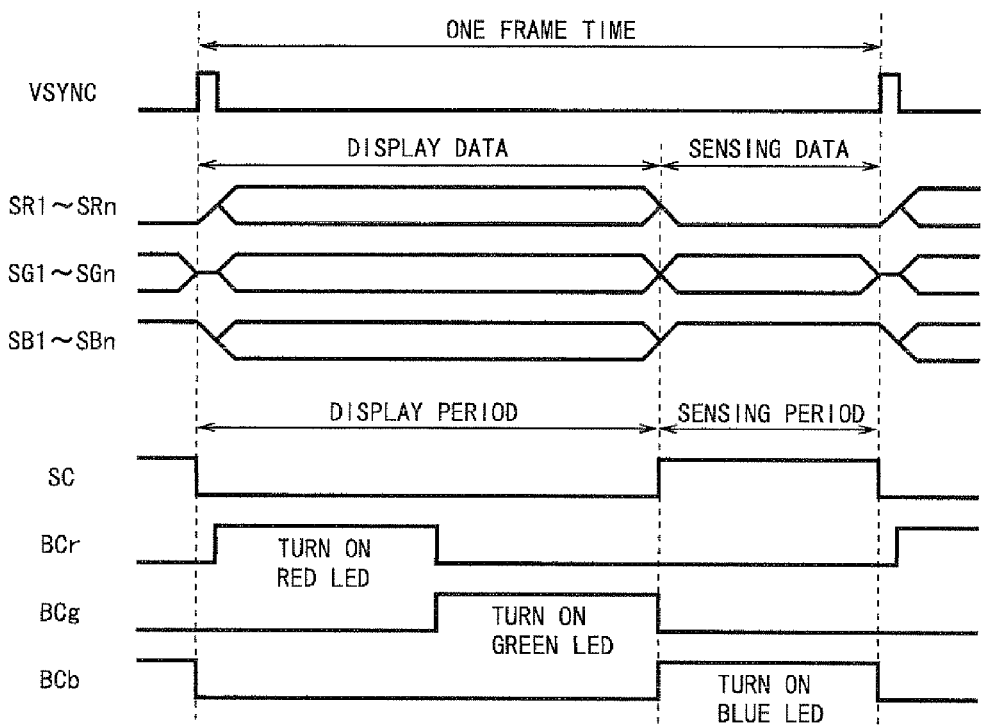
FIG. 11B is a timing chart for a reflection image mode of the device shown in FIG. 9.

An image processing unit 16 and the MPU 28 perform a touch position detection process shown in FIG. 5. Note, however, that in step S13, backlight control shown in FIG. 10 is performed. FIG. 11A is a timing chart for a shadow image mode of the liquid crystal display device 20 and FIG. 11B is a timing chart for a reflection image mode of the liquid crystal display device 20. In FIGS. 11A and 11B, waveforms are all the same except for the waveforms of the backlight control signals BCr, BCg, and BCb.

In the shadow image mode (FIG. 11A), the MPU 28 sets the backlight control signals BCb and BCg to a high level in turn for a predetermined period of time during the display period, and sets the backlight control signal BCr to a high level during the sensing period. Hence, during the display period, the blue LEDs 29b and the green LEDs 29g are turned on for the predetermined period of time, and during the sensing period, the red LEDs 29r are turned on. On the other hand, in the reflection image mode (FIG. 11B), the MPU 28 sets the backlight control signals BCr and BCg to a high level in turn for a predetermined period of time during the display period, and sets the backlight control signal BCb to a high level during the sensing period. Hence, during the display period, the red LEDs 29r and the green LEDs 29g are turned on for the predetermined period of time, and during the sensing period, the blue LEDs 29b are turned on (see FIG. 10).

The effects of the liquid crystal display device 20 according to the present embodiment will be described below. As described above, when the liquid crystal panel 11 is formed of CG silicon, the light reception sensitivity of photodiodes 6 is high for blue light and is low for red light and green light. Hence, when the blue LEDs 29b are turned on during the sensing period, the light reception sensitivity of optical sensors 2 is higher than that for when the red LEDs 29r or the green LEDs 29g are turned on. The light reception sensitivity of the optical sensors 2 being high is not desirable to detect a shadow image of an object but is desirable to detect a reflection image of the object.

In view of this, the liquid crystal display device 20 turns on light sources of blue with a high light reception sensitivity of the optical sensors 2 (blue LEDs 29b) with a higher priority during the sensing period in the reflection image mode. With this, the amount of light detected by the optical sensors 2 increases during the sensing period in the reflection image mode. Accordingly, while the power consumption of the backlight 24 is suppressed, a reflection image is made clear, enabling to increase the detection accuracy for a touch position in the shadow image mode. In addition, the liquid crystal display device 20 turns on light sources of colors with a low light reception sensitivity of the optical sensors 2 (red LEDs 29r and green LEDs 29g) with a higher priority during the sensing period in the reflection image mode. With this, the amount of light detected by the optical sensors 2 decreases during the sensing period in the shadow image mode. Accordingly, the influence of backlight light upon detecting a shadow image is reduced and a reflection image is made unclear, enabling to increase the detection accuracy for a touch position in the shadow image mode.

Note that although in the liquid crystal display device 20, the three types of LEDs 29r, 29g, and 29b are turned on in turn for a predetermined period of time during one frame time, two or more types of LEDs may be turned on simultaneously or all the three types of LEDs may be turned off simultaneously. In general, by turning on light sources of a color with a high light reception sensitivity of the optical sensors with a higher priority during the sensing period in the reflection image mode and turning on light sources of colors with a low light reception sensitivity of the optical sensors with a higher priority during the sensing period in the shadow image mode, the detection accuracy for a touch position can be increased while the power consumption of the backlight is suppressed. By thus controlling the turn-on states of the light sources of a plurality of colors which compose the backlight, according to the light reception characteristics of the optical sensors, the light reception sensitivity of the optical sensors is controlled suitably according to the conditions, enabling to increase the detection accuracy for a touch position.

(Third Embodiment)

Figure 12:
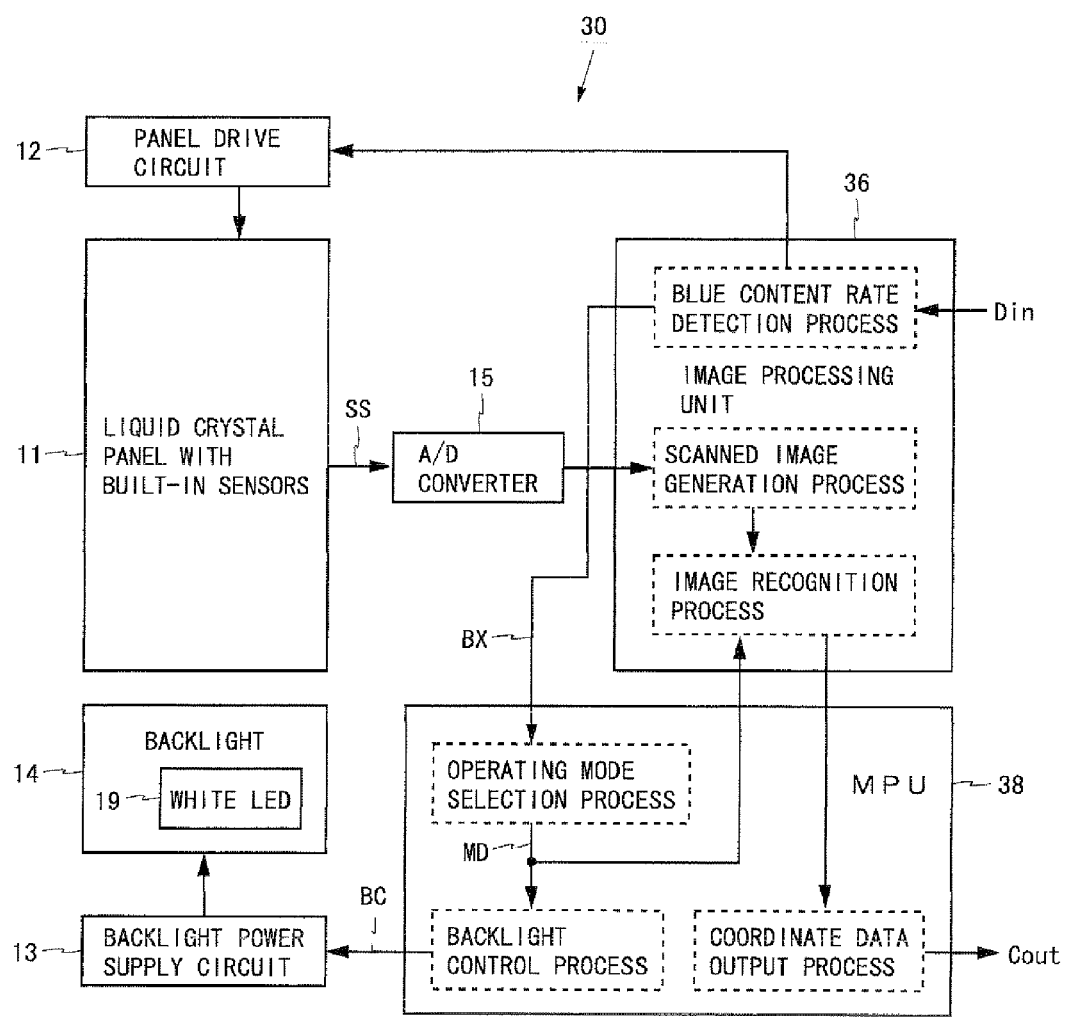
FIG. 12 is a block diagram showing a configuration of a liquid crystal display device according to a third embodiment of the present invention.

FIG. 12 is a block diagram showing a configuration of a liquid crystal display device according to a third embodiment of the present invention. A liquid crystal display device 30 shown in FIG. 12 is such that the illumination sensor 17 is removed from the liquid crystal display device 10 according to the first embodiment (FIG. 1) and the image processing unit 16 and the MPU 18 are replaced by an image processing unit 36 and an MPU 38, respectively. Of the components in the present embodiment, the same components as those in the first embodiment are denoted by the same reference numerals and description thereof is omitted.

Display data Din inputted to the liquid crystal display device 30 is supplied to a panel drive circuit 12 via the image processing unit 36. The image processing unit 36 stores a portion of the display data Din for one frame, obtains a rate of blue components contained in the portion of the display data Din for one frame (hereinafter, referred, to as a blue content rate), and outputs blue content rate data BX representing the blue content rate. The MPU 38 uses the blue content rate data BX instead of illumination data LX, when selecting an operating mode. The image processing unit 36 functions as a characteristic detecting unit that obtains the amount of a color with a high light reception sensitivity of optical sensors 2 contained in the display data Din.

Figure 13:
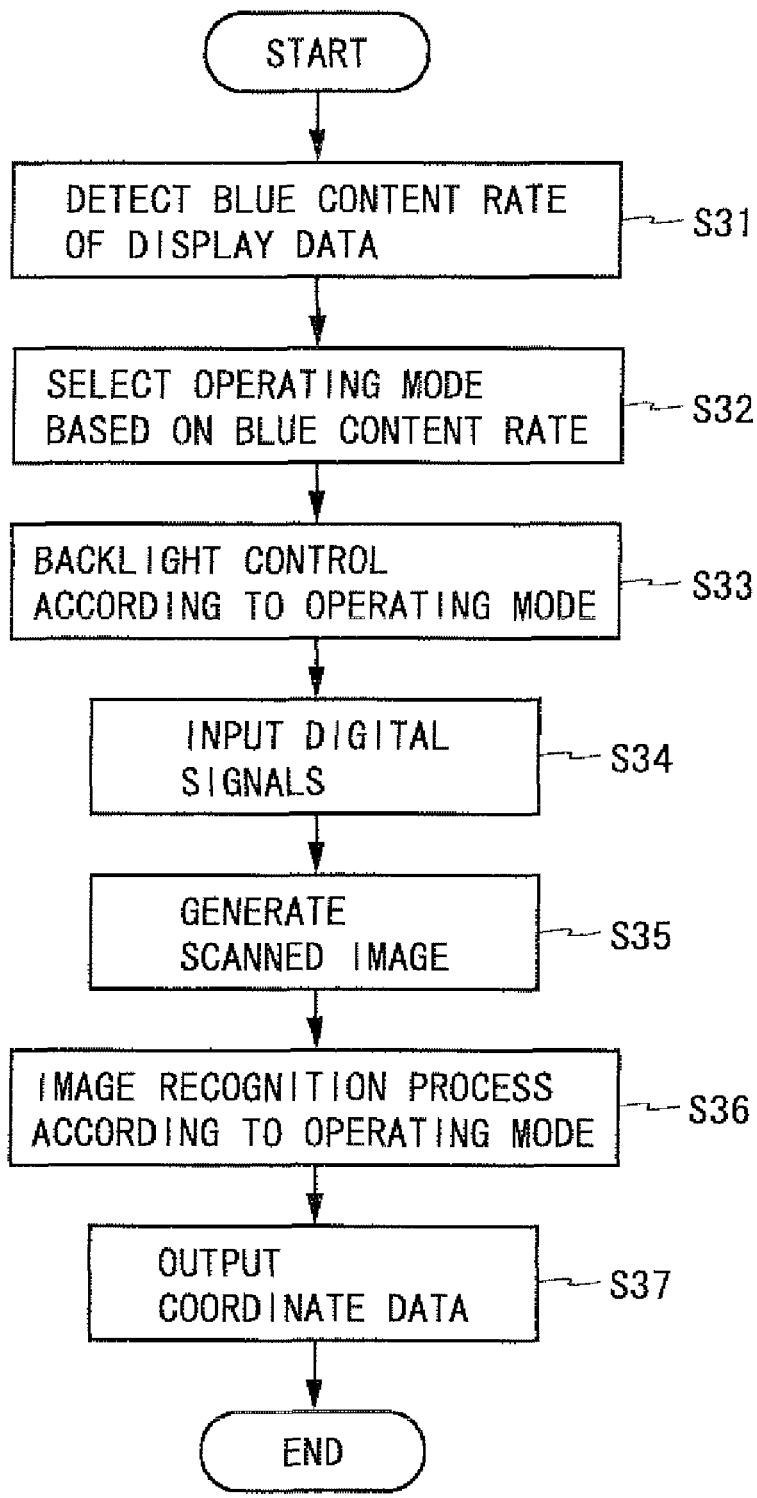
FIG. 13 is a flowchart showing a touch position detection process performed by the device shown in FIG. 12.

FIG. 13 is a flowchart showing a touch position detection process performed by the liquid crystal display device 30. The process shown in FIG. 13 is performed by the image processing unit 36 and the MPU 38 every frame time. First, the image processing unit 36 obtains a blue content rate of display data Din and outputs blue content rate data BX (step S31). Then, the MPU 38 selects an operating mode MD, based on the blue content rate data BX (step S32). In step S32, when the blue content rate is less than a predetermined threshold value, a shadow image mode is selected, and when the blue content rate is greater than or equal to the threshold value, a reflection image mode is selected. Those processes in and after step S33 are the same as those in the first embodiment and thus description thereof is omitted here.

The effects of the liquid crystal display device 30 according to the present embodiment will be described below. As described above, when a liquid crystal panel 11 is formed of CG silicon, the light reception sensitivity of photodiodes 6 is high for blue light and is low for red light and green light. Hence, when display data Din contains a large amount of blue components, the light reception sensitivity of the optical sensors 2 is high. The light reception sensitivity of the optical sensors 2 being high is not desirable to detect a shadow image of an object but is desirable to detect a reflection image of the object.

In view of this, the liquid crystal display device 30 selects the shadow image mode when the blue content rate of the display data Din is low, and selects the reflection image mode when the blue content rate is high. By thus selecting a suitable operating mode based on the amount of blue, taking into account the fact that a shadow image is easy to detect when the amount of blue is small and a reflection image is easy to detect when the amount of blue is large, the detection accuracy for a touch position can be increased while the power consumption of a backlight 14 is suppressed.

Note that although the liquid crystal display device 30 shown in FIG. 12 is a modified version of the liquid crystal display device 10 according to the first embodiment, by modifying the liquid crystal display device 20 according to the second embodiment, a similar liquid crystal display device can be configured. Note also that these liquid crystal display devices may be provided with an illumination sensor that detects the intensity of outside light. In a liquid crystal display device provided with an illumination sensor, an MPU selects either the shadow image mode or the reflection image mode, based on blue content rate data outputted from an image processing unit and illumination data outputted from the illumination sensor.

Although in the first to third embodiments, an optical sensor 2 is provided for each pixel in the liquid crystal panel 11, an optical sensor 2 may be provided for a plurality of pixels or may be provided for each sub-pixel. In addition, the backlight 14 may be configured by, for example, Cold Cathode Fluorescent Lamps (CCFLs) instead of LEDs. When the liquid crystal panel 11 is formed of amorphous silicon, the light reception sensitivity of the photodiodes 6 is high for red light and is low for green light and blue light. Thus, in such a case, by reading blue as red, the same liquid crystal display devices as those in the first to third embodiments are configured. In addition, display devices other than liquid crystal display devices can also be configured by the above-described methods.

INDUSTRIAL APPLICABILITY

Display devices of the present invention have a feature that the detection accuracy for a touch position can be increased while the power consumption of a backlight is suppressed, and thus, can be used as various display devices with optical sensors which include a backlight, such as liquid crystal display devices having a plurality of optical sensors provided in a liquid crystal panel.

The invention claimed is:

1. A display device having a plurality of optical sensors, the display device comprising:
   a display panel including a plurality of pixel circuits and a plurality of optical sensors which are arranged two-dimensionally;
   a drive circuit that drives the display panel;
   a backlight that directs light to a back surface of the display panel;
   a backlight control unit that controls the backlight such that, when a reflection image of an object is detected, an amount of light detected by the optical sensors is larger during a sensing period during which signals are read from the optical sensors than during a display period during which signals are written into the pixel circuits;
   an operating mode selecting unit that selects one of a shadow image mode that detects a shadow image of the object and a reflection image mode that detects a reflection image of the object, wherein
   the backlight control unit controls the backlight such that, when the reflection image mode is selected, the amount of light detected by the optical sensors is larger during the sensing period than during the display period;
   wherein the backlight control unit controls the backlight such that, when the reflection image mode is selected, luminance thereof is higher during the sensing period than during the display period.

2. The display device according to claim 1, wherein the backlight control unit controls the backlight such that, when the shadow image mode is selected, the luminance thereof is lower during the sensing period than during the display period.

3. A display device having a plurality of optical sensors, the display device comprising:
- a display panel including a plurality of pixel circuits and a plurality of optical sensors which are arranged two-dimensionally;
- a drive circuit that drives the display panel;
- a backlight that directs light to a back surface of the display panel;
- a backlight control unit that controls the backlight such that, when a reflection image of an object is detected, an amount of light detected by the optical sensors is larger during a sensing period during which signals are read from the optical sensors than during a display period during which signals are written into the pixel circuits;
- an operating mode selecting unit that selects one of a shadow image mode that detects a shadow image of the object and a reflection image mode that detects a reflection image of the object, wherein
- the backlight control unit controls the backlight such that, when the reflection image mode is selected, the amount of light detected by the optical sensors is larger during the sensing period than during the display period;
- a characteristic detecting unit that obtains a characteristic of display data which is supplied to the display panel, wherein
- the operating mode selecting unit selects one of the shadow image mode and the reflection image mode, based on the characteristic obtained by the characteristic detecting unit.

4. The display device according to claim 3, wherein the characteristic detecting unit obtains, as the characteristic of the display data, an amount of a color with a high light reception sensitivity of the optical sensors.

* * * * *